United States Patent Office 2,848,504
Patented Aug. 19, 1958

2,848,504
ALKYL HEXAFLUOROCYCLOBUTANES AND PROCESS FOR PREPARING THEM

Stanley Dixon, Wilmington, Del., assignor to E. I. du Pont de Nemours and Company, Wilmington, Del., a corporation of Delaware No Drawing. Application July 21, 1954
Serial No. 444,905

22 Claims. (Cl. 260—648)

This invention relates to disubstituted hexafluorocyclobutanes in which at least one substituent group is an alkyl group, and to a process for preparing such compounds.

It is known that polyfluorinated ethylenes, such as tetrafluoroethylene and chlorotrifluoroethylene, can be dimerized to polyfluorocyclobutanes. Such polyfluorocyclobutanes are quite low boiling compounds, are extremely inert chemically, and do not contain any alkyl groups which are subject to chemical attack for ready conversion to other useful derivatives, such as carboxylic acids. It is also known that the polyfluoroethylenes can be reacted with unsaturated hydrocarbons to produce polyfluorocyclobutanes which contain hydrogen on the carbon atoms of the ring. Such hydrogen-containing polyfluorocyclobutanes tend to lose HF and form unsaturated compounds when subjected to high temperatures whereby they do not have the high stability required for transformer fluids and the like. However, it is also known that hexafluoropropene ($CF_3$—$CF=CF_2$) and higher perfluoroolefins cannot be made to dimerize under any conditions known to date.

It is an object of this invention to provide new and valuable compounds which are disubstituted hexafluorocyclobutanes in which one substituent group is an alkyl group and the other substituent group is an alkyl group or a halogen atom having an atomic weight of less than 80. Another object is to provide a process whereby such new compounds can be prepared and isolated in a simple and easy manner. Other objects are to provide new compositions of matter and to advance the art. Still further objects will appear hereinafter.

The above and other objects may be accomplished in accordance with this invention which comprises heating at a temperature of from about 100° C. to about 300° C. in a closed vessel under autogenous pressure an alkyl trifluoroethylene, in which the alkyl group contains 1 to 18 carbon atoms, with a substantially equimolecular proportion of a member of the group consisting of alkyltrifluoroethylenes, in which the alkyl group contains from 1 to 18 carbon atoms, and halotrifluoroethylenes, in which the halogen atom has an atomic weight of less than 80, whereby a dimerization reaction takes place to produce a disubstituted hexafluorocyclobutane in which the substituents are on different carbon atoms of the hexafluorocyclobutane ring, one substituent being an alkyl group or 1 to 18 carbon atoms and the other substituent being a member of the group consisting of alkyl groups of 1 to 18 carbon atoms and halogen atoms having an atomic weight of less than 80, and recovering from the reaction mixture a disubstituted hexafluorocyclobutane.

The process is easily conducted and the reaction takes place readily in both the vapor phase and the liquid phase. This was unexpected in view of the fact that the perfluoroolefins containing 3 or more carbon atoms do not dimerize under any known conditions, i. e., it was not expected that the replacement of the $CF_3$ group of perfluoropropene by an alkyl group would so change the character of the compound as to permit the dimers to be formed.

The disubstituted hexafluorocyclobutanes of this invention are very stable, water-white liquids having good dielectric properties. Those containing 1 or 2 alkyl groups or 3 or more carbon atoms are very stable, high boiling compounds which do not tend to lose HF and form unsaturated compounds when subjected to high temperatures, whereby they are useful as transformer fluids. For example, when dibutylhexafluorocyclobutane was refluxed at 190–195° C. for 72 hours at atmospheric pressure in the presence of air, it remained water-white and showed no evidence of decomposition.

On the other hand, the alkyl group or groups can be oxidized by known simple methods, as by treatment with chromic acid, to produce carboxylic acids containing the hexafluorocyclobutane ring; the monoalkyl compounds yielding monocarboxylic acids and the dialkyl compounds being oxidizable to the dicarboxylic acids. The alkyl group or groups can be halogenated as by treatment with chlorine in the presence of light, and the resulting chlorinated products can be converted to the mono or dicarboxylic acid by treatment with sulfuric acid. The carboxylic acids can then be converted by known methods to esters, amides, acyl halides, and the like. Also, the alkyl group or groups, after halogenation, can be dehydrohalogenated to convert them to alkenyl groups or subjected to other known procedures to produce alcohols, glycols and the like.

In producing the new compounds of this invention by the process of this invention the alkyltrifluoroethylene can be caused to react or dimerize with itself, with another alkyltrifluoroethylene or with a halotrifluoroethylene. Thus, butyltrifluoroethylene will dimerize to form dibutylhexafluorocyclobutane in which the butyl groups will be on different carbon atoms of the hexafluorocyclobutane ring, butyltrifluoroethylene and methyltrifluoroethylene may be reacted to yield butyl, methylhexafluorocyclobutane in which the butyl group and the methyl group are on different carbon atoms of the hexafluorocyclobutane ring; and chloro, methylhexafluorocyclobutane in which the chlorine atom and the methyl group are on different carbon atoms of the hexafluorocyclobutane ring may be obtained from methyltrifluoroethylene and chlorotrifluoroethylene.

The alkyltrifluoroethylenes may be represented by the formula $CF_2=CF$—R wherein R is an alkyl group of 1 to 18 carbon atoms, such as methyl, ethyl, propyl, isopropyl, butyl, amyl, tertiary amyl, hexyl, dodecyl, cetyl, and the like. The term "alkyl group," as employed herein, is employed in its strict sense to mean a saturated aliphatic hydrocarbon radical which may be normal or branched. The alkyltrifluoroethylenes and a preferred method for preparing them are disclosed in my copending application Serial No. 374,450, filed August 14, 1953. Briefly, the alkyltrifluoroethylene is prepared by reacting tetrafluoroethylene with an alkyl lithium in an inert organic solvent and recovering the alkyltrifluoroethylene from the reaction mixture.

The halotrifluoroethylenes are well known compounds which may be represented by the formula $CF_2=CFX$ wherein X represents a halogen having an atomic weight of less than 80. In other words, the halotrifluoroethylenes are tetrafluoroethylene, chlorotrifluoroethylene and bromotrifluoroethylene. The preferred halotrifluoroethylenes are those in which the halogen has an atomic weight between 35 and 80, i. e., chlorine and bromine.

The dialkylhexafluorocyclobutanes are the most useful and versatile compounds of this invention and are preferred. Of these, the dialkylhexafluorocyclobutanes, in which each alkyl group contains 1 to 4 carbon atoms, are the most preferred.

The relative positions of the substituent groups on the hexafluorocyclobutane ring have not been precisely determined. Although, it is conceivable that the dimerization could occur so that the substituent groups would be in the 1 and 3 positions, practical experience in known dimerization reactions has shown that the substituent groups predominantly are in the 1 and 2 positions, i. e., are attached to adjacent carbon atoms of the ring. Therefore, it is believed that, in the compounds of this invention, the substituent groups are also in the 1 and 2 positions, that is, are on adjacent carbon atoms of the hexafluorocyclobutane ring, and have the formula

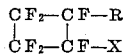

wherein R is an alkyl group and X represents an alkyl group or a halogen atom.

The process of this invention comprises subjecting the alkyltrifluoroethylene, a mixture of two alkyltrifluoroethylenes or a mixture of an alkyltrifluoroethylene and a halotrifluoroethylene to a temperature of from about 100° C. to about 300° C., preferably, from about 200° C. to about 250° C., under autogenous pressure in a closed vessel until the reaction is complete or has proceeded to the desired extent. Thereafter, the vessel and its contents are cooled and the pressure released. The reaction products are then separated by a simple distillation, usually distilling off the unreacted starting materials from the desired product.

In order to more clearly illustrate this invention and the preferred modes of carrying the same into effect, the following examples are given:

EXAMPLE 1

Dimethylhexafluorocyclobutane

Methyltrifluoroethylene (25 grams, B. P. —18° C.) is heated under autogenous pressure in a 100 cc. bomb at 250° C. for 24 hours. After being allowed to cool, the bomb is vented to yield 8 grams of recovered olefin. The bomb contents, on distillation, yield about 90% (based on conversion) of dimethylhexafluorocyclobutane, B. P. 99° C., a colorless liquid stable to cold potassium permanganate solution.

Found: C., 37.6; H, 3.11%. $C_6H_6F_6$ requires C, 37.5; H, 3.13%.

EXAMPLE 2

Dibutylhexafluorocyclobutane n-Butyltrifluoroethylene (77 grams, B. P. 70° C.) is heated under autogenous pressure in a 200 cc. bomb at 250° C. for sixteen hours. The bomb contents, on fractional distillation, yield unchanged olefin and about 90%, based on conversion, of dibutylhexafluorocyclobutane, B. P. 103° C./40 mm. Such compound has been obtained similarly at 175° C.

EXAMPLE 3

Chloro, dodecylhexafluorocyclobutane

A 200 cc. bomb is loaded with 30 grams of dodecyltrifluoroethylene (B. P. 100° C./6 mm.) and 58 grams of chlorotrifluoroethylene containing terpene inhibitor.[1] The bomb is heated at 250° C. for 24 hours and the contents distilled to yield dichlorohexafluorocyclobutane (B. P. 59° C.), unchanged dodecyltrifluoroethylene and about 75%, based on conversion of the dodecyltrifluoroethylene, of chloro, dodecylhexafluorocyclobutane, B. P. 127° C./6 mm.

Found: C, 52.2; H, 6.80%. $C_{16}H_{25}ClF_6$ requires C, 52.4; H, 6.83%.

It will be understood that the preceding examples have given for illustrative purposes solely and that this

---

[1] "Terpene B" is a $C_{10}H_{16}$ hydrocarbon fraction consisting mostly of dipentene and terpinolene; B. P. 176–196° C.; $N_D^{20}=1.470-1.478$; $d^{15.5}=0.855-0.870$.

invention is not restricted to the specific embodiments disclosed therein. On the other hand, it will be readily apparent to those skilled in the art that many variations can be made therein, particularly in the reactants and the reacting conditions within the scope of the general description, without departing from the spirit or scope of this invention.

It will be apparent that, by this invention, there is provided a new class of valuable compounds which have novel and advantageous properties. Also, by this invention, a novel method for preparing such compounds has been provided which is simple, easy and economical to operate. Accordingly, it is apparent that this invention constitutes a valuable advance and improvement in the art.

What is claimed is:

1. A disubstituted hexafluorocyclobutane in which the substituents are on different adjacent carbon atoms of the hexafluorocyclobutane ring, one substituent being an alkyl group of 1 to 18 carbon atoms and the other substituent being a member of the group consisting of alkyl groups of 1 to 18 carbon atoms and halogen atoms having an atomic weight of less than 80.

2. A dialkyl hexafluorocyclobutane in which the alkyl groups are on different adjacent carbon atoms of the hexafluorocyclobutane ring and in which each alkyl group contains 1 to 18 carbon atoms.

3. A dialkyl hexafluorocyclobutane in which the alkyl groups are on different adjacent carbon atoms of the hexafluorocyclobutane ring and in which each alkyl group contains 1 to 4 carbon atoms.

4. Dibutylhexafluorocyclobutane in which the butyl groups are on different adjacent carbon atoms of the hexafluorocyclobutane ring.

5. Dimethylhexafluorocyclobutane in which the methyl groups are on different adjacent carbon atoms of the hexafluorocyclobutane ring.

6. A disubstituted hexafluorocyclobutane in which the substituents are on different adjacent carbon atoms of the hexafluorocyclobutane ring, one substituent being an alkyl group of 1 to 18 carbon atoms and the other substituent being a halogen atom having an atomic weight of less than 80.

7. A disubstituted hexafluorocyclobutane in which the substituents are on different adjacent carbon atoms of the hexafluorocyclobutane ring, one substituent being an alkyl group of 1 to 18 carbon atoms and the other substituent being a halogen atom having an atomic weight between 35 and 80.

8. A disubstituted hexafluorocyclobutane in which the substituents are on different adjacent carbon atoms of the hexafluorocyclobutane ring, one substituent being an alkyl group of 1 to 18 carbon atoms and the other substituent being a chlorine atom.

9. Chloro, dodecylhexafluorocyclobutane in which the chlorine atom and the dodecyl group are on different adjacent carbon atoms of the hexafluorocyclobutane ring.

10. The process which comprises heating at a temperature of from about 100° C. to about 300° C. in a closed vessel under autogenous pressure an alkyltrifluoroethylene, in which the alkyl group contains 1 to 18 carbon atoms, with a substantially equimolecular proportion of a member of the group consisting of alkyltrifluoroethylenes in which the alkyl group contains 1 to 18 carbon atoms and halotrifluoroethylenes in which the halogen atom has an atomic weight of less than 80, and recovering from the reaction mixture a 1,2-disubstituted hexafluorocyclobutane in which at least one substituent is an alkyl group of 1 to 18 carbon atoms.

11. The process which comprises heating at a temperature of from about 100° C. to about 300° C. in a closed vessel under autogenous pressure an alkyltrifluoroethylene, in which the alkyl group contains 1 to 18 carbon atoms, with a substantially equimolecular proportion of an alkyltrifluoroethylene in which the alkyl group contains 1 to 18 carbon atoms, and recovering from the reaction mixture a 1,2-dialkylhexafluorocyclobutane.

12. The process which comprises heating at a temperature of from about 100° C. to about 300° C. in a closed vessel under autogenous pressure an alkyltrifluoroethylene, in which the alkyl group contains 1 to 4 carbon atoms, with a substantially equimolecular proportion of an alkyltrifluoroethylene in which the alkyl group contains 1 to 4 carbon atoms, and recovering from the reaction mixture a 1,2-dialkylhexafluorocyclobutane.

13. The process which comprises heating at a temperature of from about 100° C. to about 300° C. in a closed vessel under autogenous pressure an alkyltrifluoroethylene in which the alkyl group contains 1 to 18 carbon atoms, and recovering from the reaction mixture a 1,2-dialkylhexafluorocyclobutane.

14. The process which comprises heating at a temperature of from about 100° C. to about 300° C. in a closed vessel under autogenous pressure an alkyltrifluoroethylene, in which the alkyl group contains 1 to 18 carbon atoms, with a substantially equimolecular proportion of a halotrifluoroethylene in which the halogen atom has an atomic weight of less than 80, and recovering from the reaction mixture a 1,2-disubstituted hexafluorocyclobutane in which one substituent is an alkyl group and the other substituent is a halogen atom having an atomic weight of less than 80.

15. The process which comprises heating at a temperature of from about 100° C. to about 300° C. in a closed vessel under autogenous pressure an alkyltrifluoroethylene, in which the alkyl group contains 1 to 18 carbon atoms, with a substantially equimolecular proportion of a halotrifluoroethylene in which the halogen atom has an atomic weight between 35 and 80, and recovering from the reaction mixture a 1,2-disubstituted hexafluorocyclobutane in which one substituent is an alkyl group and the other substituent is a halogen atom having an atomic weight between 35 and 80.

16. The process of claim 10 in which the temperature is from about 200° C. to about 250° C.

17. The process of claim 11 in which the temperature is from about 200° C. to about 250° C.

18. The process of claim 12 in which the temperature is from about 200° C. to about 250° C.

19. The process of claim 13 in which the temperature is from about 200° C. to about 250° C.

20. The process of claim 14 in which the temperature is from about 200° C. to about 250° C.

21. The process which comprises heating at a temperature of from about 100° C. to about 300° C. in a closed vessel under autogenous pressure an alkyltrifluoroethylene, in which the alkyl group contains 1 to 18 carbon atoms, with a substantially equimolecular proportion of tetrafluoroethylene and recovering from the reaction mixture an alkyl substituted heptafluorocyclobutane.

22. The process of claim 21 in which the temperature is from about 200° C. to about 250° C.

References Cited in the file of this patent

UNITED STATES PATENTS

| | | |
|---|---|---|
| 2,627,528 | Coonrade et al. | Feb. 3, 1953 |
| 2,668,182 | Miller | Feb. 2, 1954 |

FOREIGN PATENTS

| | | |
|---|---|---|
| 856,145 | Germany | Nov. 20, 1952 |